United States Patent
Kulasooriya

(10) Patent No.: US 11,727,458 B2
(45) Date of Patent: Aug. 15, 2023

(54) PRODUCE COMPARISON SYSTEM

(71) Applicant: Codify AI Inc., Woodside, CA (US)

(72) Inventor: Mani Kulasooriya, Woodside, CA (US)

(73) Assignee: Cut and Dry Inc., Woodside, CA (US)

( * ) Notice: Subject to any disclaimer, the term of this patent is extended or adjusted under 35 U.S.C. 154(b) by 680 days.

(21) Appl. No.: 16/699,484

(22) Filed: Nov. 29, 2019

(65) Prior Publication Data

US 2020/0175564 A1  Jun. 4, 2020

Related U.S. Application Data

(60) Provisional application No. 62/773,129, filed on Nov. 29, 2018, provisional application No. 62/819,170, filed on Mar. 15, 2019.

(51) Int. Cl.
*G06F 16/00*  (2019.01)
*G06Q 30/0601*  (2023.01)
(Continued)

(52) U.S. Cl.
CPC ....... *G06Q 30/0625* (2013.01); *G06F 16/248* (2019.01); *G06F 16/285* (2019.01);
(Continued)

(58) Field of Classification Search
None
See application file for complete search history.

(56) References Cited

U.S. PATENT DOCUMENTS 9,824,117 B1  11/2017  Adogla et al.
10,032,451 B1 *  7/2018  Mamkina ................ G10L 15/18
(Continued)

FOREIGN PATENT DOCUMENTS

WO  2018071501 A1  4/2018

OTHER PUBLICATIONS

Kimura, Akisato, et al., "Few-shot learning of neural networks from scratch by pseudo example optimization", Last modified: Jul. 5, 2018 [online]. [Retrieved on Feb. 26, 2020]. Retrieved from the Internet: https://arxiv.org/abs/1802.03039 US 2017/0193586 AI (Wal-Mart Stores, Inc.) Jun. 6, 2017, claims 1,9, [0I 11]-[0112], 13 pp.

*Primary Examiner* — Farhan M Syed
(74) *Attorney, Agent, or Firm* — Perkins Coie LLP; Colin M. Fowler

(57) ABSTRACT

Ordering and delivery of food ingredients and food service items is opaque and inefficient. A computer system for recommending substitute food products to food service providers is disclosed. The system contains a database of information about food products that is continuously updated. The database is updated by food service providers and vendors submitting information about food products and the system tags the items entered and sorts them into the database. The system then provides recommendations to food service providers of substitute food products by comparing a food service provider's order history with a query entered with items in the database. A method for increasing efficiency in delivery of food products by streamlining the ordering and delivery process is also disclosed. The streamlined system includes options for price as a function of delivery route and a central container location for food delivery to multiple food service providers within one geographic location.

21 Claims, 7 Drawing Sheets

(51) Int. Cl.
  *G06Q 10/083*     (2023.01)
  *G06N 20/00*      (2019.01)
  *G06F 16/28*      (2019.01)
  *G06F 16/248*     (2019.01)
  *G06N 5/04*       (2023.01)

(52) U.S. Cl.
  CPC ............... *G06N 5/04* (2013.01); *G06N 20/00* (2019.01); *G06Q 10/083* (2013.01); *G06Q 30/0603* (2013.01)

(56) References Cited

U.S. PATENT DOCUMENTS

| | | | |
|---|---|---|---|
| 10,332,508 B1 * | 6/2019 | Hoffmeister | G06N 3/08 |
| 10,388,274 B1 * | 8/2019 | Hoffmeister | G06N 3/044 |
| 10,567,515 B1 * | 2/2020 | Bao | G10L 17/22 |
| 10,572,679 B2 * | 2/2020 | Frank | G06F 16/24578 |
| 10,715,604 B1 * | 7/2020 | Bao | G10L 17/22 |
| 10,803,859 B1 * | 10/2020 | Williams | G10L 17/06 |
| 10,911,596 B1 * | 2/2021 | Do | G10L 17/00 |
| 11,127,405 B1 * | 9/2021 | Antos | G10L 15/30 |
| 11,280,777 B2 * | 3/2022 | Farkas | G01N 33/12 |
| 2004/0143600 A1 | 7/2004 | Musgrove et al. | |
| 2011/0085697 A1 | 4/2011 | Clippard et al. | |
| 2011/0314031 A1 | 12/2011 | Chittar et al. | |
| 2012/0117072 A1 | 5/2012 | Gokturk et al. | |
| 2016/0170996 A1 * | 6/2016 | Frank | G06Q 30/0203 707/748 |
| 2016/0224803 A1 * | 8/2016 | Frank | G06F 21/6245 |
| 2017/0193586 A1 | 7/2017 | Yuan et al. | |
| 2017/0193588 A1 * | 7/2017 | Loui | G06F 16/583 |
| 2019/0290172 A1 * | 9/2019 | Hadad | G06N 20/00 |
| 2019/0293620 A1 * | 9/2019 | Farkas | G01N 21/6456 |

\* cited by examiner

PRODUCE COMPARISON SYSTEM

CROSS-REFERENCE TO RELATED APPLICATION(S)

This application claims priority to U.S. provisional patent application Ser. No. 62/773,129, filed Nov. 29, 2018, and U.S. provisional patent application Ser. No. 62/819,170 filed Mar. 15, 2019, both of which are incorporated herein in its entirety by this reference thereto.

TECHNICAL FIELD

This disclosure relates to a system for improving ordering and delivery of food products.

BACKGROUND

Ordering food products from vendors and producers within the food services industry is an inefficient and opaque process. It is inefficient because vendors and producers do not provide a sufficient amount of information on the food products that they are selling. Often a product description will only contain limited information about the product. This description may not contain information that is important to the purchaser, such as, whether the products certified organic or not.

Many of the old processes for ordering food products are outdated and inefficient. Food is ordered using a paper form. This paper form only has a listing of the product name. It might have a SKU (stock keeping unit) or a UPC (universal product code) associated with the product name, but no real descriptors of the product. Once the food is received it arrives with a paper invoice that is equally opaque and lacking in descriptors. Because the data is all on paper and not digitized, the data is hard to aggregate for food product purchases. Purchasers, vendors and manufacturers would all benefit from additional information on food purchasing trends.

The distribution of food products is very inefficient. For a restaurant to make the dishes that they sell each evening, the restaurant may need to source food products from multiple vendors. Each of those vendors delivers their products using their own delivery service. The delivery service travels a route to many locations in a single day, dropping off only a few items at each. If the products delivered were gathered at a central location, then the delivery process could be streamlined. Inefficiency in delivery not only drives up prices, but also congests roads and pollutes the environment.

DETAILED DESCRIPTION

Figure 1:
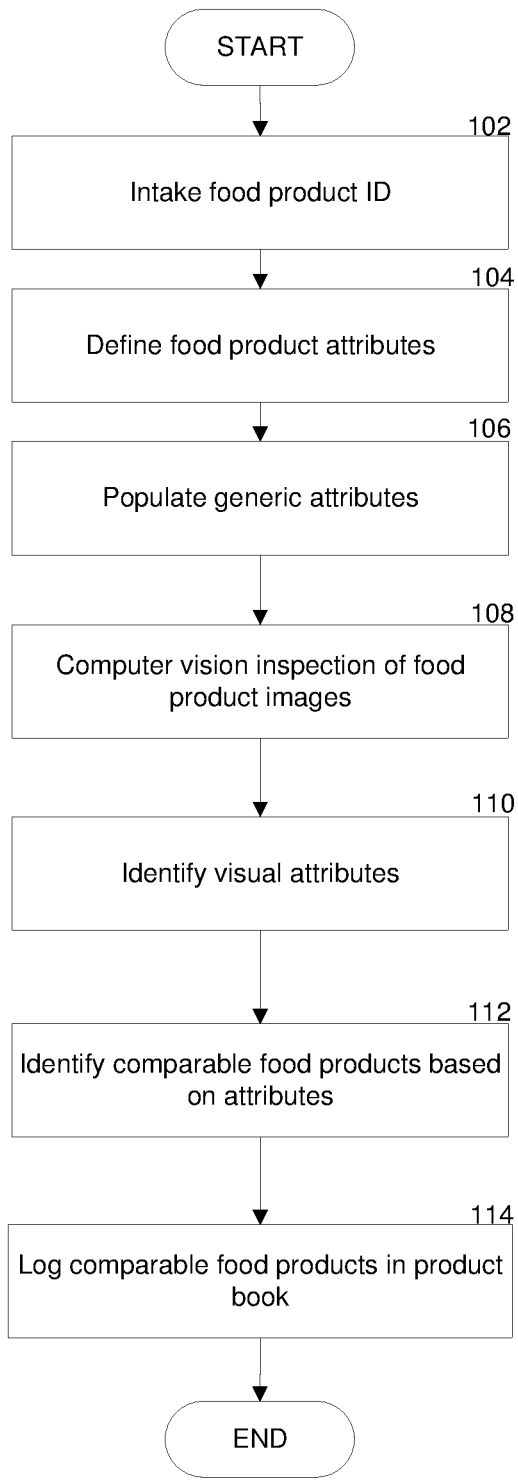
FIG. 1 is a flowchart illustrating a method to identify comparable food products.

Described below are methods for improving efficiency and transparency in food ordering and distribution for food service providers. A system is described for improving ordering of food from food vendors, growers, and manufacturers. The system uses an indexed marketplace where purchasers can compare products between vendors and then purchase those products that best fit their needs.

In addition, a method for creating, updating, and improving an indexed database of food items that are distributed by various vendors is described. The indexed database is improved by user input that can be used to validate previous entries or to create new entries. Users may be given an award, such as a future discount, for providing information about a given product.

Lastly, a system for improving distribution of food products is described below. The system provides improvements to food distribution by providing lockers where food from various vendors can be delivered for various purchasers within a geographic region. Each purchaser within a geographic region has their own locker within a given location within that geographic region. Food distributors deliver the food to the lockers in each area and then the purchasers retrieve the food items from their designated locker.

The present disclosure describes a method for improving the food distribution industry. Namely, an initial indexed database of food service products is compiled and continuously updated. The initial indexed database is used to train a model to identify food products, food product packaging, and other data associated with food products. Then the model is used to identify information in photos and other relevant formats. Then the information obtained by the model is used to fill in gaps in the initial indexed database. The model continuously updates the indexed database in this way. Then the system uses the indexed database to recommend food products to food service providers using a model trained to recommend food products. Another model uses the indexed database to coordinate delivery of food products in an efficient manner to food service providers.

A food service provider is any person or company that sells food directly to consumers. A food service provider may include but is not limited to restaurants, cafeterias, food trucks, caterers, street food vendors, concessions, and any other entity that purchases food products wholesale and then sells them to consumers. The food service provider could prepare the food prior to selling it or sell it as is to the consumers.

A vendor is any person or entity that sells food products to food service providers. A vendor may obtain the food from another provider or may manufacture, grow, catch, raise, distill or prepare the food themselves.

A food product may include but is not limited to produce that is raw or processed, meat that is raw or processed, manufactured food items, and food service goods, such as items for preparing or serving food.

An indexed database is a database of food products where each food item has tags defining attributes of the food items. The attributes can be generic or visual. A generic attribute is an attribute that is described by a text string. A visual attribute is an attribute that is described with a picture. The tags can belong to specific categories. Categories can be independent or part of a group that belong to all food products that are similar. Such as a category of tags for apples would be variety.

The current system for obtaining food ingredients for restaurants and other food service providers is inefficient and lacks transparency. A food service provider must source food products from a variety of vendors. Vendors only provide information on the food products they sell and often that information is incomplete. The information may only include a name for the item and maybe a SKU or a UPC. For a food service provider to find sufficient information on food products sold by a vendor or different food products that are similar to the products the food service provider typically buys the food service provider must work through a variety of vendors to source price and quality comparisons.

The method described below helps food service providers source food products from a variety of vendors while comparing price and quality. The method also provides recommendations of substitutes if a particular food product is not available or undesirable for any reason such as price, quality, or origin. The method uses a model to compare input data about food products desired and matches that data with existing inventory. This method can help a food service provider find food products that are comparable alternatives if a food product is out of stock or too expensive.

Obtaining food products for a food service provider is inefficient and lacks transparency. When a food service provider orders food products for their business they talk to various vendors to determine what food products they have on hand, and what the quality and price is for the available food products. The food service provider then takes the information gathered from various vendors and compares it. After comparing the information the food service provider may call several of the vendors to discuss a reduction in price based on the price offered by another vendor.

Food service providers select vendors based on their relationships with those vendors, the type or quality of food products sold by that vendor, or the prices offered by a particular vendor. Vendors rely on sales teams to work with food service providers. These sales teams reach out to food service providers to promote the food products that they have in stock. Currently, pricing is determined on a per customer basis based on relationship and consumption.

One major problem that a food service provider may have is if the vendor that they typically use is out of stock of a particular item. The food service provider cannot visit every vendor to see if they are selling a comparable food product. The food service provider may expect a certain quality from their food product or they may need that food product to possess a specific attribute so their recipe can be duplicated.

Another issue that a food service provider may encounter is if they sell a certain dish seasonally, where they need a food product for a period of time and then they don't need it for a long time and then they need it again. When the food service provider orders the food product after a period of inactivity, they will want a product that is similar in quality to the food product that they ordered before. There currently is not a good system for comparing these products.

Ordering the same or a similar food product after a period of inactivity may be difficult because the vendor not still sell the food product that they sold before or the quality of the product may have changed in the interim. A food service provider may not know that the quality has changed until they visually inspect the food product.

If the food product is no longer available from the previously used vendor then the food service provider must look for the food product elsewhere. This can be a time-consuming activity. Vendors have to be identified and price and quality must be compared before the food service provider can order the food product again.

The present disclosure describes a method for creating a continuously updating indexed database that contains information on food products that food service providers can purchase from vendors. This indexed database is used within a product book computer system. A product book is a system that identifies which similarly labeled food products are comparable to the food product requested, which food products are possible substitutes and which are not comparable or suitable to be a substitute.

A method for comparing products within a product book system and then suggesting a similar product is disclosed below. The present disclosure describes a method for creating a indexed database of food products that can be used to improve the ordering process. It does this by giving food service providers more detailed information about the food products that they are ordering.

The present disclosure also describes a product book system with a trained model for comparing food products. The model takes information inputted by users and then analyzes that information for particular attributes and suggests similar food products based on the attributes identified.

The product book system provides a quick and easy way for food service providers to compare food products across vendors. The model recommends possible substitutes for food products. It does this by comparing the attributes of the desired food ingredient with the available items for sale. The suggested substitutes can be suitable because of a number of different factors.

In some embodiments, a second model is trained to identify food products that a particular food service provider may desire. The model can learn what attributes a food service provider typically desires and then apply those attributes in later sessions and suggest food products based on a food service providers previous selection.

Described below is one embodiment of the present invention. To create a model that can compare food products first a indexed database of information must be built. The indexed database can consist of text information and images.

FIG. 1 is a flowchart illustrating a method to identify comparable food products. In step 102, the product book system intakes a given food product ID. The ID may be an arbitrary designation or may be used to index and later search for the item. In step 104, the given food product is provided generic attributes. The generic attributes are metadata concerning the product. Attributes are "generic" if they can be determined by any unskilled observer, are often included on labels, and/or are required disclosure by law (e.g., under FDA regulation). For example, a source or manufacturer is a common type of generic attribute. Other common types of attribute are size, weight, or a food class or type (e.g., Granny Smith apples vs. Macintosh apples). Not every item will have all the same generic attributes. However, food products that are similar in type may have similar generic attribute categories (e.g., all apples may have the same generic attribute categories despite having different values for those categories). For example, all eggs may have the generic attribute categories of variety of chicken, size, free range or not, cage free or not, organic feed or not, locally sourced or not.

In step 106, a record for the given food product is populated with the metadata of the generic attributes. The record may be stored in a indexed database. In step 108, a computer vision process is applied to images of the given food product. The computer vision process uses a trained machine learned model to inspect the food product. In step 110, the result of the computer vision process is used to identify visual attributes of the given food product. Visual attributes are those that may be determined by a skilled visual inspection of the food product. Food service providers know what qualities they like in food products and initially will select those attributes. Once a model is trained to look for food products in a manner, preferences may be taken into account. Examples of visual attributes include colorization patterns in many types of food products, fat marbling in meat, and shape of produce.

In step 112, comparable food products are identified in the indexed database as substitutes. Food products that have similar generic and visual attributes are linked. Linking comparable food products enables the system to offer food service providers food products from vendors they may not know that have competitive prices on food products that are comparable to those that the food service provider usually purchases. In step 114, comparable food products are logged in the indexed database as substitutes of one another.

In some embodiments, there are three ways that information about food products can be entered into the indexed database. First, through a profile created by a food service provider where they upload pictures, enter text information, upload a SKU, upload a UPC or enter any other identifying information about the food products that they would like purchase. Second, is by vendors uploading pictures, entering text information, uploading a SKU, uploading a UPC or entering any other identifying information of their products to the indexed database. Third, pictures of food products, text information, SKUs, UPCs or any other identifying information can be added to the indexed database from the internet or any other suitable source.

The system has a software as a service ("SaaS") platform, which establishes a marketplace between food service providers and vendors. Vendors can advertise supplies for sale, offer sales/discounts, and food service providers can make orders. Payment is processed via the SaaS platform. The SaaS is a business application for the food service providers, the application automates the entire process of obtaining food products.

A food service provider creates a user profile. Within this profile are attributes about the food service provider. These attributes may consist of name, location, profile picture, contact information, size, genre of food served, and type of food service provider. The profile also contains a list of possible food products that the food service provider could order.

The food service provider can provide information to the indexed database about particular foods that they have previously purchased. This information can either be provided in text form, by uploading pictures, by uploading a SKU, by uploading a UPC or by entering any other identifying information.

After the image is uploaded the food service provider may select attributes from a list of attributes about the food product. This information is entered into the indexed database.

According to one embodiment, a food service provider may upload a photo of a food product and then assign that food product attributes such as variety, origin, size, storage method, organic, or physical appearance. For example, a food service provider may upload a picture of a potato and then assign the potato attributes that are relevant to the potato such as variety, size, and shape. As a second example, a food service provider may upload a picture of a can of tuna and then assign the can of tuna relevant attributes such as species of tuna, solid or chunk, water-packed or oil-packed, dolphin safe or not, or whether or not it is certified by the Marine Stewardship Council.

Any pictures and attributes that are uploaded to the profile are saved to the indexed database for future use. The indexed database also saves any additional attributes that the model may generate.

A vendor will also create a user profile. Within this profile are attributes about the vendor. These attributes may consist of name, location, profile picture, contact information, size of vendor, genre of food distributed, and type of food establishment they typically serve. The profile also contains a list of possible food products that the vendor sells.

The vendor uploads pictures, text, a SKU, a UPC, or any other identifying information about a food product that they have in stock and selects certain attributes that apply to that particular food product. The model then analyzes any pictures for further attributes. Then the picture and the attributes are saved to the indexed database for future use.

The indexed database also uses information and pictures that are collected from the internet to further flush out the indexed database. The information collected may be text, a SKU, a UPC or any other identifying information. Pictures and information collected are used to train the model to recognize specific attributes of food products.

Figure 2:
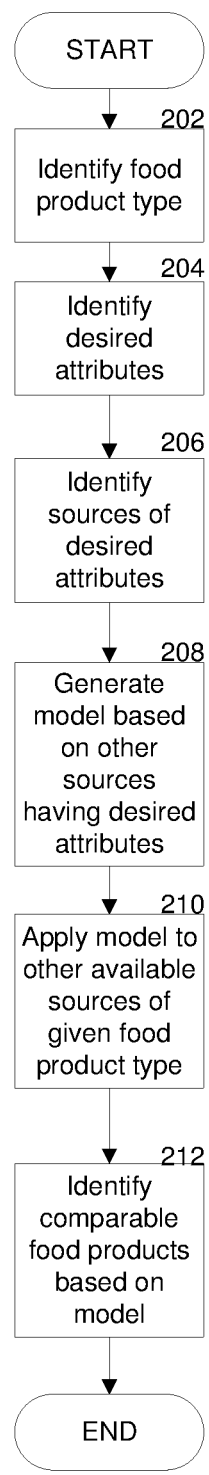
FIG. 2 is a flowchart illustrating a method for generating a machine learning model that compares food products.

FIG. 2 is a flowchart illustrating a method for generating a machine learning model that compares food products. When determining comparable products, it is understood that not every aspect need be identical for a food product to be comparable for a given food service provider. Not every food service provider cares about every potential attribute of a food product.

In step 202, a food service provider first identifies a food product type they are interested in training a model on (e.g., steaks). In step 204, the food service provider identifies what attributes about the product type interests them. Identifying visual attributes that a food service provider is interested in may be based on sample visual attributes that have been previously reported for that product type. Alternatively, the food service provider may identify a new visual attribute. Where a new visual attribute is identified, the food service provider provides an original source image or set of source images. Portions of that source image can be selected using image editing software to identify relevant visual attributes.

In step 206, the system identifies sources of desired characteristics by analyzing images, text and other identifying information about a food product. The system assumes that the desired features exist in the food products the food service provider has previously purchased. Alternatively, or in addition, the food service provider can identify sources that have the desired features/attributes such as vendors that sell food products that have the desired attributes. Once sources of food product information are identified, additional data can be sourced to build a model for the desired visual attribute. In step 208, the system builds a model for the identified attribute based on the source data.

Food service providers or vendors may use the camera on their smartphone to streamline the process of adding images. The system, using the model, can automatically tie the image to a food product in that food service provider's cart or a food product delivered to them in a previous shipment. That image is fed back into the indexed database in the product book system and used to improve the model. Using computer vision, the system can identify the food product and determine the size, volume, and other relevant characteristics.

In some embodiments, the model may use an algorithm similar to "face-matching." A "face-matching" algorithm is an algorithm that identifies unique features of a person's face and then matches those unique features with additional pictures of a person's face. The algorithm is adapted here to look at pictures of food products and match them with pictures of food products from the indexed database. The model that uses the "face-matching" algorithm is trained using a large set of pictures of food products that include a number of labeled attributes.

Some attributes may be defined by the "face-matching" algorithm. The attribute is not specifically called out by the food service provider or vendor but based on a photo that the food service provider has uploaded attributes of the food product are determined using the "face-matching" algorithm.

In step 210, the system applies the model to other available source data of the given food product (e.g., from different producers or manufacturers). When applied, the system determines whether other available food products include the desired generic or visual attributes, based on evaluation via the model. In step 212, food products that evaluate positively with the model are identified as comparable/substitutable food products.

The model is trained using a large collection of pictures. In some embodiment, the model analyzes food pictures for their attributes and determines what percentage match there is that a given picture depicts a given food product. As the model identifies various food products, then those pictures of food products are added to the indexed database.

After the product and its objective attributes have been stored in the indexed database a computer vision process is applied to the images of the given food product. The computer vision process uses a trained machine learned model to inspect the food product. The results of the computer vision process are used to identify visual attributes of the given food product. Visual attributes may be attributes that could be determined by a skilled visual inspection of the food product.

The system may use the "face-matching" algorithm to identify additional attributes of the food product being analyzed. The user may not specifically call out an attribute but the system can use their purchase history and other food product pictures that they have uploaded to their profile to help define a attribute. The "face-matching" algorithm can aggregate this data and define the attribute.

According to other embodiments, the model is trained using few-shot learning. Few-shot learning uses a small number of photos (a support set) to train the model. The few-shot model is trained with an underlying model to use the support set to identify some attributes about the food product and then identify what food products are similar. In another embodiment, the few-shot model is trained to look at a narrow area of a photo and match that area with the photos in the indexed database to determine what other food products that photo should be compared to.

Additionally, the system analyzes pictures that are uploaded by vendors for their attributes. The system then applies a tag to each attribute. The tags are then aggregated to generate an indexed marketplace of food products. This allows food products from different vendors that posses similar tags to be matched. This enables the system to later recommend similar food products to food service providers.

Validating the attributes of a food product can be done by confirming those attributes. This is done by seeking additional sources to confirm the attributes of a particular food product.

For the system to verify a food product, it must identify a threshold number of attributes. Confidence that a food product has been identified correctly increases with each attribute that has been identified. Typically, about nine attributes are used to identify with confidence a food product within the indexed marketplace.

According to one embodiment, if a user uploads a photo of a cut of meat, or if that photo is obtained from the internet. The user could be a food service provider, a product book system administrator, or a vendor. Then the system analyzes that photo to determine the following attributes of the cut of meat: cut type, marbling, attributes, bone in/out preparation style (is it marinated, seasoned, or raw), grade, form (whole, sliced, or portioned). If the packaging for the cut of meat is included in the picture and the text is visible then the system may determine the cut and other claims from the packaging. Claims may include such things as whether the meat is organic, industry certified, its origin, the brand and any other claim that may be listed on the packaging. Where the packaging is not included, the cut of the meat may still be identified via the trained food model via food image segmentation and/or convolutional analysis across a number of layers.

According to one embodiment, information can be crowd-sourced from users of the system. A food product may not have any information listed or the system may have very few attributes about a product or the attributes may not be validated. The system could then request assistance from the food service providers and vendors. A message would be sent to each user in the system or each user who has purchased a particular food product requesting a picture of the food product or text describing the food product or for the users to validate certain attributes about the food product. Once a sufficient amount of new information about the food product has been obtained then the system can determine if the food product has been verified.

A method for encouraging users to respond to requests for information is to have a rewards system. In some embodiments, the system could incentivize users to respond to queries for information by offering them incentives. Incentives could be such things as a discount that could be applied to later purchases or points that accumulate and can be redeemed for various rewards.

To incentivize users to provide additional photographs of food products to populate a model, users may be rewarded with tokens through a decentralized application (dapp). Tokens may be crypto-tokens. Providing images to the machine learning model (e.g., the "face-matching" algorithm) may be treated similarly to "mining" in a cryptocurrency/crypto-token system. For comparison, Bitcoin "mining" is performed by hashing transactions. In a similar manner, providing images to the model and further educating the model can be treated in the same fashion as "mining." The user gains a double benefit of identifying comparable food products for future use, and the immediate satisfaction of earning tokens through the "work" of submitting input to the indexed database.

The tokens do not have to carry direct monetary value. Instead the tokens may be used as a pseudo currency for advertising or marketing goods on the overall marketplace (be it as a food service provider or a vendor). Because the marketplace knows the users who are buying specific food products, using tokens to obtain visibility to those food service providers is valuable to the vendors. Food service providers may use the tokens directly during ordering as credit or currency.

Figure 3:
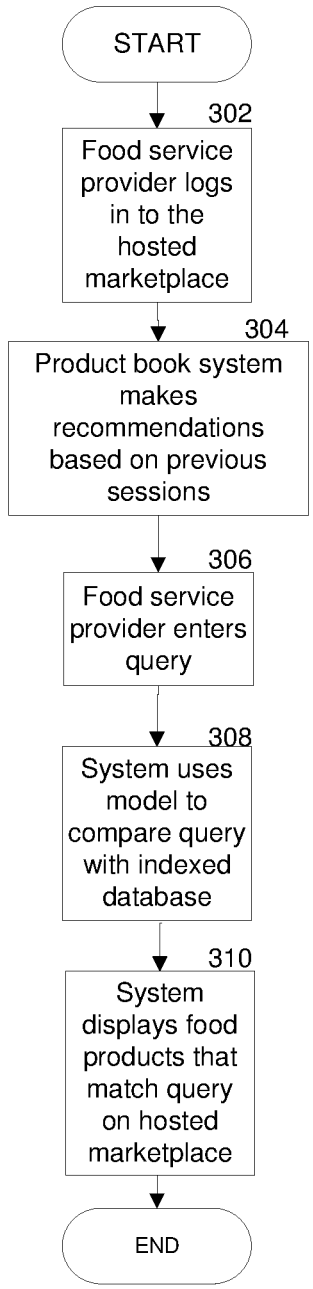
FIG. 3 is a flowchart illustrating a method to provide suggested food product substitutes to food service providers.

FIG. 3 is a flowchart illustrating a method to provide suggested food product substitutes to food service providers. In step 302, food service providers log in to the hosted marketplace. Each food service provider has their own unique login for their business. In step 304, the product book system compares the information gathered from the food service providers previous login to create preferences for the user. The product book system then compares those preferences to the indexed database using the model to generate a list of food products previously ordered and food products that are comparable to previously ordered food products. The system then displays the generated list on the hosted marketplace. Where one vendor has similar food products to another vendor, the similar goods are linked in the system. The comparison to a food product can be given as a percentage. For example, some products could be a 100% match, if they are identical (e.g., from the same manufacturer), or some lower percentage (e.g., 75%) where the food products have many similar attributes but come from a slightly different background.

In some embodiments, comparison may be based on a scoring system where one or more tiers indicating a degree of matching are defined by threshold scores. Scores are computed based on the sharing of similar or matching values across the attributes associated with the given food product. In some instances, the matching of a given attribute is rendered more scoring weight than other attributes.

Suggestions on the hosted marketplace application show linked food products. Linked food products may be compared based on comparative price and relevant offers made by the vendors. The marketplace enables further transparency in pricing. Currently pricing is determined on a per customer basis based on relationship and consumption. The marketplace removes the human element.

In step 306, a food service provider enters a query into the hosted marketplace system. The query can be a text string or a picture. In step 308, the hosted marketplace system compares the query to the indexed database. In step 310, the system displays food products that are comparable to the query on the hosted marketplace application.

The system has a second model that is used to provide recommendations to food service providers. A food service provider enters information about the food product that they wish to purchase into the system. The system then uses the second model to compare the information entered to information in the indexed database. Food products that correlate with the information entered are then presented to the food service provider. A food product correlates when the model indicates that a threshold level of confidence has been reached that the information entered is a substitute or correlates with a food product in the indexed database.

In some embodiments, the system compares a food service providers previous orders and then makes suggestions for food products that are the same or similar to the food products that the food service provider previously ordered. For example, a food service provider may order a given SKU of a pork tenderloin every week and the system suggests a different SKU from another vendor for pork tenderloins. While a catalog entry for the first SKU and the different SKU may indicate only tacit similarity (e.g., both are pork tenderloins), the comparison of attributes in the product book enables a deeper comparison using more attributes than are available in an ordering catalog.

In some embodiments, the system may recommend food products based on a food service provider's previous orders. For example, a food service provider may order 30 bunches of bananas every week, so the system will recommend 30 bunches of bananas with comparable attributes from another vendor after the food service provider has logged in, before they have entered any information about their order.

In some embodiments, the system may recommend food products that are typically paired together. For example, a food service provider may order pancake mix and the system identifies that pancake mix is typically ordered with syrup so it may suggest syrup, or sugar and mapleine for making syrup.

In some embodiments, the system may make recommendations based on what other similar food service providers are ordering. For example, the system recognizes that food service providers whom previously ordered a given SKU from a given vendor have shifted to another SKU from another vendor. The system then recommends that a user whom makes orders of the given SKU from the given vendor make the switch as others have regardless of attribute matching.

In some embodiments, the system may make recommendations based on previous recommendations that were successful. A recommendation is successful if a food service provider has placed an order for a food product after that food product was recommended to them. For example, the system recommended to a first food service provider that they order milk from Dairy B because it is less expensive than milk from Dairy A. The first food service provider then placed an order for milk from Dairy B and maybe continued to order from Dairy B. When a subsequent food service provider enters a query for milk the system then recommends milk from Dairy B. The system may also display that the milk from Dairy B is less expensive than the milk from Dairy A.

The system can generate a best match for the user. This is most useful when a user is looking for something that is substantially similar to a food product that they already use. The user inputs what food product they are looking for, such as, a cut of meat with a certain type of marbling. The system then compares their entry regarding the cut of meat and compares it to all of the meat in the indexed database, generating best matches for the information entered. The best match is then recommended to the food service provider.

Some variables will change but others will stay the same. For example, when looking for beef with certain marbling. The system would only search beef and certain cuts of beef. The system then displays the results of the search on the hosted marketplace application. These results would be different vendors that sell meat that matches the criteria entered and the prices of that meat along with other product and vendor information.

When the system displays a match, it can display the match as a percentage confidence. The system takes in the user input. The user input can consist of pictures, or a word description of what they are looking for. If the input is a picture then the system uses layered convolutional image analysis to determine what the attributes are of the food product submitted as input. The system may also use previous data gleaned from previous entries by that user to further define the search. Then the system compares the user input to the indexed database of food products. The system then provides the user with results showing the items that best match their inputs.

Beyond information that is entered by a food service provider, such as photos and text, the system can also learn to match the "chef's eye" of a food service provider. This is done by collecting data from a food service provider's previous sessions, analyzing that data and determining trends.

For example, a food service provider may search for food products that are typically used in the preparation of Italian food, in particular marinara sauces. On previous occasions, the food service provider purchased roma tomatoes at a reduced price. The model looks at the commonalties between all of the previous orders of tomatoes and determines that the tomatoes ordered all had a reduced price and some had slight blemishes. In subsequent sessions, when the food service provider inputs that they are looking for roma tomatoes, the system may suggest roma tomatoes with slight blemishes.

In another example, a food service provider is searching for roma tomatoes. This food service provider seeks out the lowest price but only selects roma tomatoes without a blemish because they are used in displays. The user never enters that they want tomatoes without blemishes, but the system can recognize this by comparing the data from each of their orders. In future sessions, the system only recommends roma tomatoes without blemishes.

Transparency enables users to see attributes of food products. For example, food service providers can see price as a function of volume, and shipment style (e.g., where a user is willing to take a truck drop every two weeks instead of twice a week). Price may also be a function of distance that a food service provider is from the distribution center. Price based on distribution center location may lead food service providers to different vendors, thus the utility of finding comparable food products is high. Potentially, there is another vendor that is much closer or is in route already and is willing to give the food service provider a better price. Different variables would dictate the price including delivery and proximity.

Presently the system for ordering food products is very inefficient. From a procurement standpoint, at the restaurant level, the whole process of checking one's inventory, managing orders, getting the invoices, and payments are very human intensive and paper-based today.

If a food service provider sends out eight orders to eight different vendors, then at least eight trucks will make the deliveries and each will drop off an individual invoice. Presently, a food service provider might do a quick visual check and then take that invoice and put it in a shoebox in the back office, and then once a week or once every other week a bookkeeper will come and input the invoices into QuickBooks, authorize payments, provide a report to the owner showing any discrepancies.

The system enables a user to take a picture of their invoice when it is dropped off. The system digitizes the invoice, automatically populates QuickBooks (or similar extension) in real time, as well as provides reports to the food service provider in real time. Doing so provides a service to the food service provider and enables the system to accumulate data on what the food service provider is buying, from whom, in what quantity, at what price, and what frequency.

The system tracks shipment history of vendors. For example, if a given truck leaves a first city at 6 o'clock in the morning, that truck will do three stops in a second city and one stop in a third city. The driver takes a lunch, then he goes to a fourth city to do two stops. The driver goes to a fifth stop, and then by that time it's 5 o'clock and the driver goes back. This pattern may be typical of a given driver. Adding a stop to the route is effectively a problem solved by the traveling salesperson algorithm where the addition of a given stop can be inserted into the otherwise historical route at a cost based on the locations of known historical stops.

A given food service provider is motivated to change their usage behavior if they get a price reduction. If the traveling salesperson algorithm using the historical shipment data, the system can give discounts on food products, where the food service provider is willing to accept the full delivery on a particular day and a particular time range, and at a particular frequency. The system aggregates a number of food service providers for those product categories in a limited geographic area. The system can manage orders with the vendor based on the aggregation of food service providers.

Figure 4:
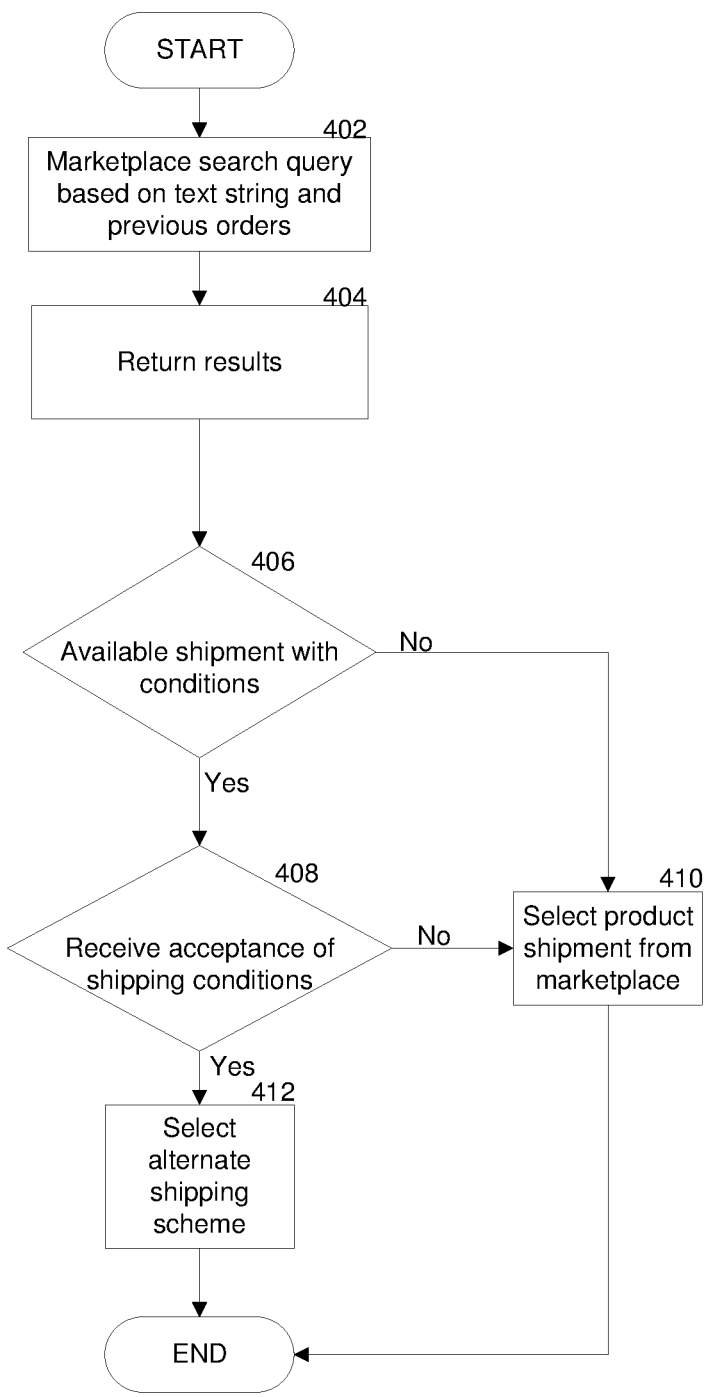
FIG. 4 is a flowchart that illustrates a method for attaching shipment conditions to an order.

FIG. 4 is a flowchart that illustrates a method for attaching shipment conditions to an order. In step 402, A food service provider queries the marketplace for a given food product. In step 404, the marketplace returns results for that food product including exact and comparable products. Each of the food products includes a price. The price may be variable based on agreement to conditions of receipt. In step 406, the system determines whether a shipment condition is available for the food products. For example, receive shipments only once a week, or once every other week. Other examples include receiving shipments at a particular time. Shipment conditions are available based on a determination from historical delivery models of vendors including historical delivery routes. The model may also include indications of new routes, or potentially suggested new routes for vendors (e.g., the system collects a group of orders in a given area and indicates to the supplier that a new route that delivered goods at a given time is more optimal than current routes). In this manner, the system may create an offer for the vendor where shipping conditions are suggested to the vendor.

Where a shipping precondition exists, in step 408, the system queries the food service provider regarding acceptance of the terms. Where no shipping precondition exists, or where one exists, and the food service provider does not accept it, in step 410, the food service provider specifies orders of the product based on traditionally selected shipping conditions. Where the food service provider agrees to a shipping precondition, in step 412, the system informs the vendor of the specified route. The system then processes the transaction.

Figure 5A:
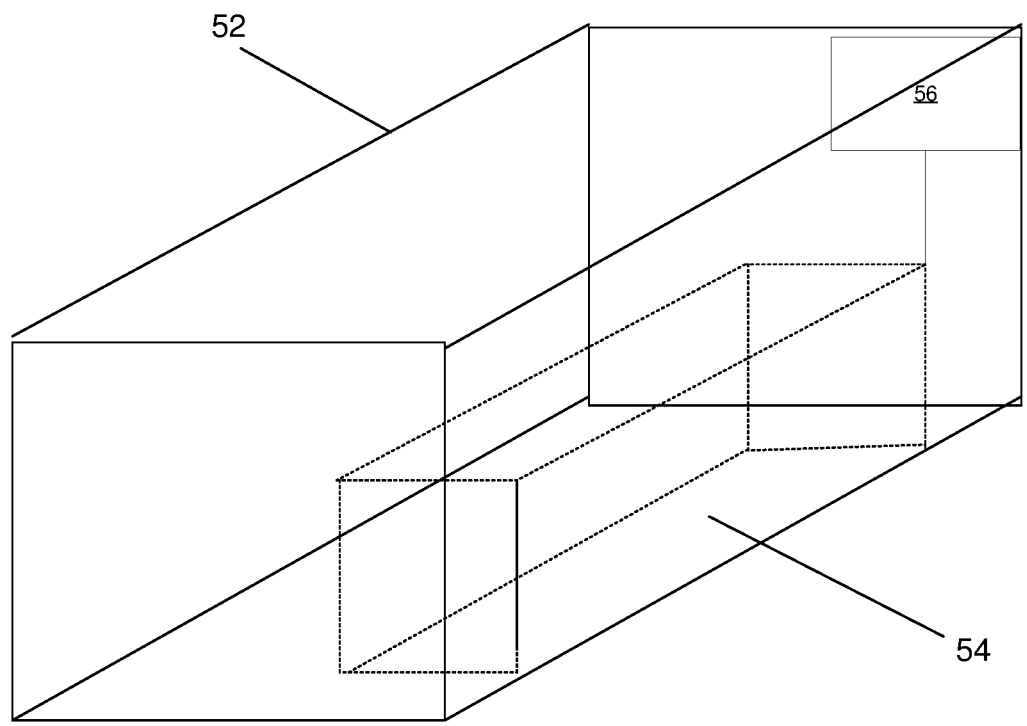
FIG. 5A is a block diagram of a shipping container including refrigerated storage lockers.
Figure 5B:
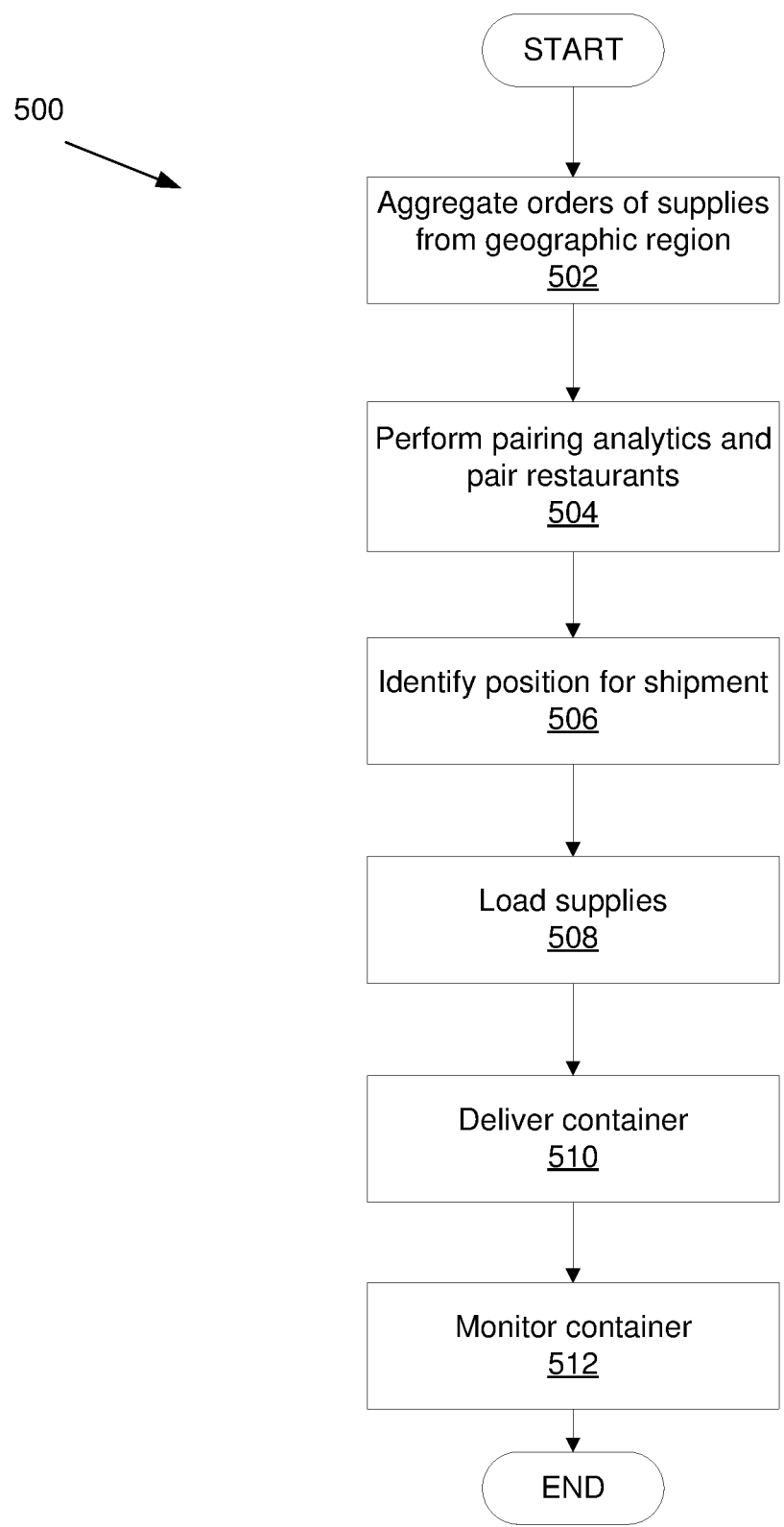
FIG. 5B is a flowchart that illustrates aggregate predictive deliveries.

FIGS. 5A and 5B are a block diagram of a shipping container including refrigerated storage lockers and a flowchart that illustrates aggregate predictive deliveries. A valuable advantage obtained during management of supplies for multiple restaurants within a similar geographic region (for example, a downtown neighborhood) is to aggregate prediction data for a cluster of restaurants. Given prediction data for the supply requirements of a given geographic region of restaurants, a single, large supply drop can be made for the entire cluster of restaurants. For example, delivery of a container to a rented parking space or storage location. The individual restaurants are able to come pick up their supplies whenever they want those supplies. The shipping container may be monitored by access codes or smart phone applications paired with sensors. Distribution supplies still operate "last mile" type logistics but shift the burden of the "last meter" to the restaurants. The shipping container/storage unit may include lockers with supplies for individual restaurants. Each locker may include secure access features such as a key card, or a passcode to access the locker. In some embodiments the storage location or shipping container is refrigerated.

FIG. 5A illustrates a shipping container 52 including a rack of individualized refrigerated lockers 54. The refrigerated lockers 54 may be cooled by a refrigeration system 56.

The refrigeration system may be powered by a power source (generator, batteries, solar system, etc.) stored inside the shipping container 52 or using an external power source. Each individualized locker of the refrigerated lockers 54 may be securely accessed through a locking mechanism such as key, a keypad, RFID, Bluetooth communication with a key device (smart phone, dongle, etc.). In some embodiments, the individualized lockers 54 include wireless transceivers to notify a central server when they have been opened. In some embodiments the shipping container 52 includes a security camera.

In step 502, a platform for managing supply logistics aggregates supply orders from a given geographic region. The given geographic region may vary in size. In some embodiments the geographic region is a neighborhood, a district, a borough, or a town/city. In step 504 the system performs pairing analytics on prior history of orders and geographic location of restaurants in a similar geographic region. In some embodiments, multiple restaurants are paired/grouped together based on similarity in any of geographic location and/or supply needs. Similarity in supply needs may be based on required delivery temperature, physical footprint/space requirements, sourcing location, or logistical convenience (e.g., supplies located at same distribution location).

In step 506, the system determines a shipping container drop location based on available space and the location of each restaurant that has been paired together. In some embodiments, rather than a shipping container a permanent storage area is used. In such embodiments, step 506 identifies a given fixed position storage area from a number of available fixed position storage areas to use. In step 508 the shipping container is loaded with supplies for the restaurants where each set of supplies is placed in an individualized locker. In some embodiments the individualized locker is refrigerated. In step 510 the shipping container is delivered to the drop location determined in step 506.

In step 512, various employees of the grouped restaurants visit the shipping container or storage area and access their secure locker in order to obtain their supplies. The receipt of supplies may be monitored remotely to determine which individualized lockers have been opened.

Figure 6:
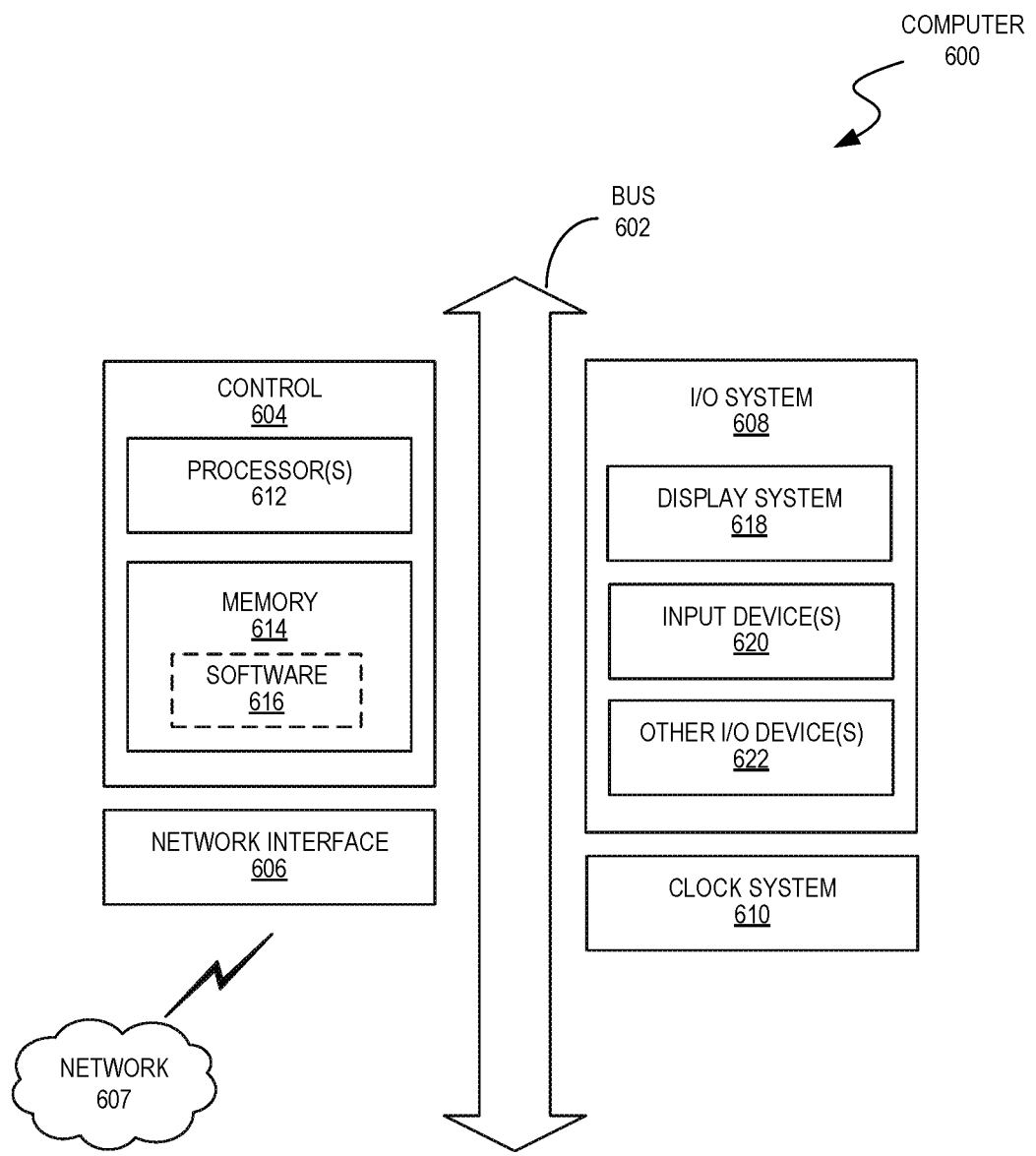
FIG. 6 is a block diagram of a computer operable to implement the disclosed technology according to some embodiments of the present disclosure.

FIG. 6 is a block diagram of a computer 600 operable to implement the disclosed technology according to some embodiments of the present disclosure. The computer 600 may be a generic computer or specifically designed to carry out features of the disclosed system. For example, the computer 600 may be a system-on-chip (SOC), a single-board computer (SBC) system, a desktop or laptop computer, a kiosk, a mainframe, a mesh of computer systems, a handheld mobile device, or combinations thereof.

The computer 600 may be a standalone device or part of a distributed system that spans multiple networks, locations, machines, or combinations thereof. In some embodiments, the computer 600 operates as a server computer or a client device in a client-server network environment, or as a peer machine in a peer-to-peer system. In some embodiments, the computer 600 may perform one or more steps of the disclosed embodiments in real time, near real time, offline, by batch processing, or combinations thereof.

As shown in FIG. 6, the computer 600 includes a bus 602 that is operable to transfer data between hardware components. These components include a control 604 (e.g., processing system), a network interface 606, an input/output (I/O) system 608, and a clock system 610. The computer 600 may include other components that are not shown nor further discussed for the sake of brevity. One who has ordinary skill in the art will understand elements of hardware and software that are included but not shown in FIG. 6.

The control 604 includes one or more processors 612 (e.g., central processing units (CPUs)), application-specific integrated circuits (ASICs), and/or field-programmable gate arrays (FPGAs), and memory 614 (which may include software 616). For example, the memory 614 may include volatile memory, such as random-access memory (RAM), and/or non-volatile memory, such as read-only memory (ROM). The memory 614 can be local, remote, or distributed.

A software program (e.g., software 616), when referred to as "implemented in a computer-readable storage medium," includes computer-readable instructions stored in the memory (e.g., memory 614). A processor (e.g., processor 612) is "configured to execute a software program" when at least one value associated with the software program is stored in a register that is readable by the processor. In some embodiments, routines executed to implement the disclosed embodiments may be implemented as part of an operating system (OS) software (e.g., Microsoft Windows® and Linux®) or a specific software application, component, program, object, module, or sequence of instructions referred to as "computer programs."

As such, the computer programs typically comprise one or more instructions set at various times in various memory devices of a computer (e.g., computer 600), which, when read and executed by at least one processor (e.g., processor 612), will cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 614).

The network interface 606 may include a modem or other interfaces (not shown) for coupling the computer 600 to other computers over the network 607. The I/O system may operate to control various I/O devices, including peripheral devices, such as a display system 518 (e.g., a monitor or touch-sensitive display) and one or more input devices 620 (e.g., a keyboard and/or pointing device). Other I/O devices 622 may include, for example, a disk drive, printer, scanner, or the like. Lastly, the clock system 620 controls a timer for use by the disclosed embodiments.

Operation of a memory device (e.g., memory 624), such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A method comprising:
   training a food product machine learning model using a plurality of data items thereby establishing a trained food product model, the plurality of data items each labeled with values corresponding to a set of comparable attributes across matching food associated with different sources, the set of comparable attributes corresponding to a matching food product, the data items including any of:
   images;
   ordering catalog entries; or
   unique identifiers;
   receiving, by the trained food product model from a user, a query including a food product associated with a first food product source;
   identifying, by the trained food product model, a confidence score that the query has a first value corresponding to a first food product attribute of the set of comparable attributes across matching food, wherein the confidence score is based on the training of the food product model; and
   returning user-specific query results including a second food product associated with a second food product source, wherein the second food product source represents a source substitute for the first food product source, and wherein the second food product is included in the user-specific query results based on a food usage history associated with the user and a particular subset of comparable attributes associated with the user.

2. The method of claim 1, further comprising:
   verifying, by the trained food product model, that the confidence score for the query has exceeded a threshold amount, corresponding with the first food product attribute thereby establishing a verified first food product attribute.

3. The method of claim 2, further comprising:
   detecting, by the trained food product model, a second food product attribute that is typically associated with a verified first food product attribute;
   identifying, by the trained food product model, a confidence score that the query has a second value corresponding to a second food product attribute of the set of comparable attributes across matching food, wherein the confidence score is based on the training of the food product model; and
   verifying, by the trained food product model, that the confidence score for the query has exceeded a threshold amount, corresponding with the second food product attribute thereby establishing a verified second food product attribute.

4. The method of claim 3, further comprising:
   identifying, by the food product model, that values associated with the query corresponding to the first food product attribute and the second food product attribute belong to a set of attributes corresponding to a first discrete food product; and
   classifying the query as the first discrete food product.

5. The method of claim 4, further comprising:
   identifying, by the trained food product model, values for additional attributes of the set of comparable attributes across matching food of the first discrete food product;
   comparing, by the trained food product model, values associated with the first food product attribute, the second food product attribute, and the additional attributes of the first discrete food product with values associated with the set of comparable attributes across matching food of other discrete food products; and
   generating, by the trained food product model, a search rank score between the first discrete food product and other discrete food products based on similarity between respective values of attributes, wherein the other discrete food products includes the second discrete food product, and wherein the user-specific query results are based on the search rank score.

6. The method of claim 5, wherein said generating the search rank score further includes a scoring weight applied to each attribute of the set of attributes.

7. The method of claim 6, further comprising:
   displaying the search results on a hosted marketplace application user interface.

8. The method of claim 1, wherein the trained food product model is based on a:
   convolutional neural network architecture;
   hidden Markov model architecture; or
   few-shot model architecture.

9. A method for recommending a source substitute, the method comprising:
   receiving, by a trained food product model via a user, a query, the query referring to a first discrete food product associated with a first food product source, wherein discrete food products are associated in the trained food product model with a combination of values corresponding to a set of comparable attributes across matching food;
   comparing, by the trained food product model, values associated with the set of comparable attributes across matching food of the first discrete food product with values associated with the set of comparable attributes across matching food associated with other discrete food products sources;
   generating, by the trained food product model, search rank scores between the first discrete food product and other discrete food products that match the first discrete food product and have different sources based on similarity between respective values of attributes; and returning user-specific search results including a second discrete food product associated with a second food product source based on the search rank scores, wherein the second food product source represents the source substitute for the first food product source, and wherein the second discrete food product is included in the user-specific search results based on a food usage history associated with the user and a particular subset of comparable attributes associated with the user.

10. The method of claim 9, wherein the query is embodied as any of:

an image;

an ordering catalog entry; or a unique identifier.

11. The method of claim 10, wherein the ordering catalog entry and the unique identifier are each values of the set of comparable attributes across matching food.

12. The method of claim 9, wherein said generating the search rank score further includes a scoring weight applied to each attribute of the set of comparable attributes across matching food.

13. The method of claim 9, further comprising:

displaying the search results on a hosted marketplace application user interface.

14. The method of claim 9, wherein said generating the search rank score is further based on a proximity of a user address to a delivery vehicle route associated with a given discrete food product.

15. A system comprising:

a food product machine learning model configured using a plurality of data items including images, ordering catalog entries, and unique identifiers, the plurality of data items each labeled with values corresponding to a set of comparable attributes across matching food associated with different food product sources, the comparable attributes corresponding to a matching food product;

a memory storing an underlying dataset including the plurality of data items for the food product machine learning model;

a search engine network server configured to receive a query including a food product from a user, the search engine configured to (i) use the food product machine learning model to link the query to a first discrete food product associated with a first food product source via identification of the values corresponding to the set of comparable attributes across matching food, and (ii) return user-specific search results including a second discrete food product associated with a second food product source, wherein the second food product source represents a source substitute for the first food product source, and wherein the second discrete food product is included in the user-specific search results based on a food usage history associated with the user and a particular subset of comparable attributes associated with the user.

16. The system of claim 15, wherein the search engine network server is further configured to:

compare values associated with the set of comparable attributes across matching food of the first discrete food product with values associated with the set of comparable attributes across matching food of other discrete food products; and generate a search rank score between the first discrete food product and other discrete food products based on similarity between respective values of comparable attributes, wherein the other discrete food products include the second discrete food product.

17. The system of claim 16, wherein said generation of the search rank score further includes a scoring weight applied to each attribute of the set of comparable attributes across matching food.

18. The system of claim 17, further comprising:

a user interface associated with a client application configured to display the search results.

19. The system of claim 15, wherein the food product machine learning model is based on a:

convolutional neural network architecture;

hidden Markov model architecture; or few-shot model architecture.

20. The system of claim 16, wherein said generation of the search rank score is further based on a proximity of a user address to a delivery vehicle route associated with a given discrete food product.

21. The system of claim 18, wherein, displayed search results on the user interface are linked to an order form for the second discrete food product within the client application.

* * * * *